United States Patent
Samanna Vijayaraghavan et al.

(10) Patent No.: US 11,218,404 B2
(45) Date of Patent: Jan. 4, 2022

(54) NETWORK DIVERSITY RESOLUTION SYSTEM

(71) Applicant: AT&T Intellectual Property I, L.P., Atlanta, GA (US)

(72) Inventors: Vikram Samanna Vijayaraghavan, Menlo Park, CA (US); Michael Jensen, East Palo Alto, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 391 days.

(21) Appl. No.: 15/979,535

(22) Filed: May 15, 2018

(65) Prior Publication Data
US 2019/0356577 A1 Nov. 21, 2019

(51) Int. Cl.
*H04L 12/721* (2013.01)
*H04L 12/707* (2013.01)
(Continued)

(52) U.S. Cl.
CPC ............ *H04L 45/127* (2013.01); *H04L 41/12* (2013.01); *H04L 41/145* (2013.01);
(Continued)

(58) Field of Classification Search
None
See application file for complete search history.

(56) References Cited

U.S. PATENT DOCUMENTS

| 3,729,591 A | 4/1973 | Gueldenpfenning et al. |
| 5,943,062 A * | 8/1999 | Schanel ............... G06F 30/18 345/440 |

(Continued)

OTHER PUBLICATIONS

Design of Cellular Networks with Diversity and Capacity Constraints Peter Kubat, Member, IEEE, J. MacGregor Smith, and Calvin Yum (Year: 2000).*

*Primary Examiner* — Minh Chau Nguyen
*Assistant Examiner* — Ishrat Rashid
(74) *Attorney, Agent, or Firm* — Guntin & Gust, PLC; Atanu Das

(57) ABSTRACT

A network diversity resolution system comprising: a diversity assessment tool, the diversity assessment tool including a path finding module and a sampling module that communicate with an input/output device; the path finding module communicates with an enterprise data warehouse; the path finding module configured to search through a network inventory stored in the enterprise data warehouse, the path finding module constructing a representation to identify at least two representative paths between a selected first end point and a second end point; wherein the at least two representative paths meets at least a capacity requirement between the first end point and the second end point; and wherein the sampling module generates at least one circuit reassignment plan based on the at least two representative paths, wherein the sampling module provides a score for each of the at least one circuit reassignment plan, wherein the score is based on at least one of a machine preference, path length, and number of changes to implement the at least one circuit reassignment plan, wherein the at least one circuit reassignment plan incorporates at least one representative path having a highest score.

13 Claims, 13 Drawing Sheets

(51) Int. Cl.
　　　*H04L 12/24*　　　(2006.01)
　　　*H04L 12/725*　　(2013.01)
(52) U.S. Cl.
　　　CPC .......... *H04L 41/5054* (2013.01); *H04L 45/22*
　　　　　　　　　(2013.01); *H04L 45/3065* (2013.01)

(56)　　　　　　　References Cited

U.S. PATENT DOCUMENTS

| | | | |
|---|---|---|---|
| 6,122,282 | A | 9/2000 | Chng |
| 6,842,425 | B1 | 1/2005 | Mannepalli et al. |
| 7,986,617 | B2 | 7/2011 | Knepley, Jr. et al. |
| 8,472,347 | B2 | 6/2013 | Knepley, Jr. et al. |
| 8,503,314 | B2 | 8/2013 | Simmons et al. |
| 8,600,978 | B2 | 12/2013 | Cherng et al. |
| 8,897,167 | B2 | 11/2014 | Simmons et al. |
| 9,509,593 | B2 | 11/2016 | Sharma et al. |
| 2007/0041513 | A1* | 2/2007 | Gende .................. H04M 3/5116 379/37 |
| 2008/0172172 | A1 | 7/2008 | Ng |
| 2011/0153507 | A1* | 6/2011 | Murthy ................ G06Q 30/016 705/304 |
| 2011/0170536 | A1 | 7/2011 | Shinjo et al. |
| 2011/0228702 | A1* | 9/2011 | Knepley, Jr. .......... H04L 45/126 370/254 |
| 2014/0177476 | A1* | 6/2014 | Perrett .................. H04L 41/145 370/255 |
| 2017/0078191 | A1 | 3/2017 | Choi et al. |

* cited by examiner

NETWORK DIVERSITY RESOLUTION SYSTEM

TECHNICAL FIELD

This disclosure relates generally to network management and, more specifically, to resolving diversity issues in network connections. More particularly, the disclosure relates to a network diversity resolution system that includes a diversity assessment tool that identifies representative circuits that do not have a diversity issue. Most particularly, the network diversity system establishes a new path based on the representative circuits factoring at least the path length and number of changes needed to implement the new path.

BACKGROUND

Communication networks have migrated from using specialized networking equipment executing on dedicated hardware, like routers, firewalls, and gateways, to software defined networks (SDNs) executing as virtualized network functions (VNF) in a cloud infrastructure. To provide a service, a set of VNFs may be instantiated on the general purpose hardware. Each VNF may require one or more virtual machines (VMs) to be instantiated. In turn, VMs may require various resources, such as memory, virtual computer processing units (vCPUs), network interfaces or network interface cards (NICs), and servers.

One benefit of cloud computing is the elastic nature of the cloud and the ability to share resources among users and/or spin up virtual resources on demand. Elasticity of resources extends to processing power, storage, bandwidth, virtual functions, and virtual machines. The amount of resources that can be sourced through cloud computing incorporates nearly all facets of computing from raw processing power to storage space. The proliferation of network resources, however, provides a network management problem in the context of maintaining diverse connections for critical services.

These critical services currently include emergency response services operating over the network, such as, 911. Future critical services include dedicated networks for first responders. Such critical services have a complex set of diversity requirements that have to be met to reduce the likelihood that a failure within the network, such as an equipment losing power or a fiber cut does not interrupt the critical service's function.

Presently, there is no systematic way to arrive at a set of paths for circuits that meet these diversity requirements, or resolve diversity violations that arise due to the dynamic nature of the network. While network engineers are able to perform this exercise when the required capacity between end points is small, the task is impossible when required capacity is large. Moreover, as networks continue to grow, the capacity required for the critical services also grows creating a need for a system that efficiently resolves network diversity issues. The disclosure includes examples addressing at least one of these problems.

SUMMARY

The following disclosure generally relates to a network diversity system comprising a diversity assessment tool, the diversity assessment tool including a path finding module and a sampling module that communicate with an input/output device; the path finding module communicates with an enterprise data warehouse; the path finding module configured to search through a network inventory stored in the enterprise data warehouse, the path finding module constructing a representation to identify at least two representative paths between a selected first end point and a second end point; wherein the at least two representative paths meets at least a capacity requirement between the first end point and the second end point; and wherein the sampling module generates at least one circuit reassignment plan based on the at least two representative paths, wherein the sampling module provides a score for each of the at least one circuit reassignment plan, wherein the score is based on at least one of a machine preference, path length, and number of changes to implement the at least one circuit reassignment plan, wherein the at least one circuit reassignment plan incorporates at least one representative path having a highest score.

According to another example, the disclosure relates to a network device comprising: a processor, an input/output device coupled to the processor, and a memory coupled with the processor, the memory comprising executable instructions that when executed by the processor cause the processor to effectuate operations comprising: upon receiving a diversity issue for a path between at least two end points, via the input/output device, obtaining possible path information including at least two representative paths; assigning a score to the at least two representative paths; identifying a solution based on the score.

According to a further example, the disclosure relates to a method comprising: instantiating a diversity assessment tool, the diversity assessment tool including a path finding module virtual network function and a sampling module virtual network function that communicate with an input/output device and a memory; obtaining path information from an electronic data warehouse; the path finding module identifying at least two representative paths between a selected first end point and a second end point, wherein the at least two representative paths meets at least a capacity requirement between the first end point and the second end point; and the sampling module generating at least one circuit reassignment plan based on the at least two representative paths, wherein the generating step includes assigning a score for each of the at least one circuit reassignment plan, wherein the score is based on at least one of a machine preference, path length, and number of changes to implement the at least one circuit reassignment plan, wherein the at least one circuit reassignment plan incorporates at least one representative path having a highest score.

BRIEF DESCRIPTION OF THE DRAWINGS

In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

Figure 1A:
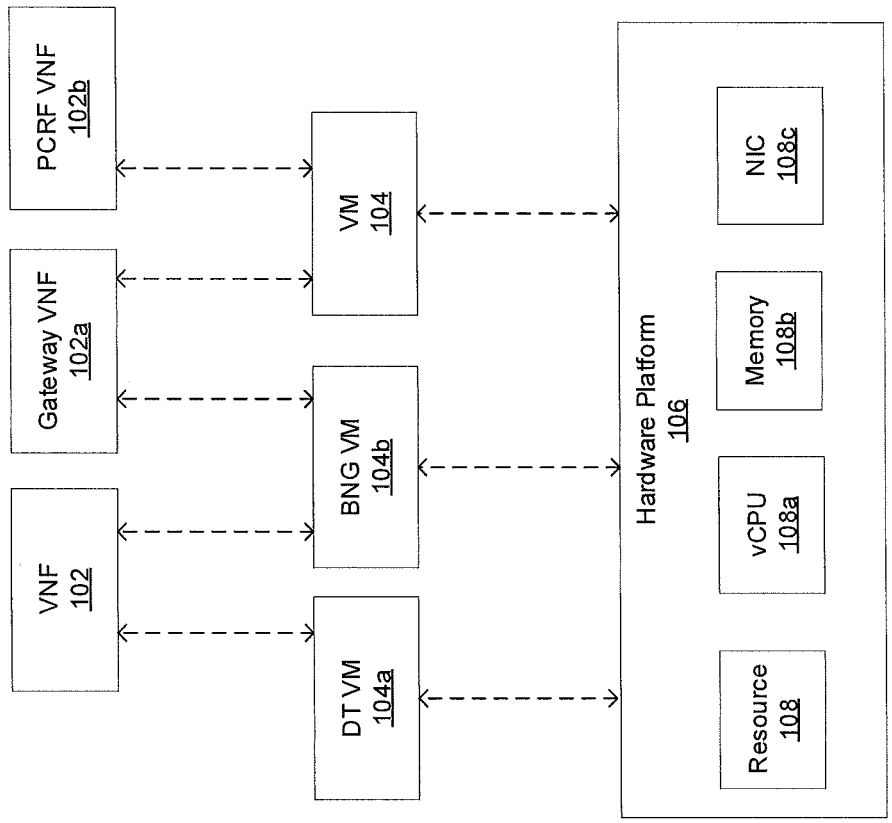
FIG. 1A is a representation of an exemplary network.

A network diversity system is general indicated by the number 200 in the accompanying figures. In general, system 200 resolves diversity violations that arise in networks. System 200, therefore, may be used in connection with a number of networks including telecommunications networks. Examples of various telecommunications networks are described in the examples provided below and referenced in FIGS. 4-10. System 200 may be implemented within a software defined network. FIG. 1A is a representation of an exemplary network 100. Network 100 may comprise a software defined network or SDN—that is, network 100 may include one or more virtualized functions implemented on general purpose hardware, such as in lieu of having dedicated hardware for every network function. General purpose hardware of network 100 may be configured to run virtual network elements to support communication services, such as mobility services, including consumer services and enterprise services. These services may be provided or measured in sessions.

A virtual network function(s) (VNF) 102 may be able to support a limited number of sessions. Each VNF 102 may have a VNF type that indicates its functionality or role. For example, FIG. 1A illustrates a gateway VNF 102a and a policy and charging rules function (PCRF) VNF 102b. Additionally or alternatively, VNFs 102 may include other types of VNFs including but not limited to security, routing, wide area network (WAN) optimization and others within a service providers virtual network offerings.

Each VNF 102 may use one or more virtual machine (VM) 104 to operate. Each VM 104 may have a VM type that indicates its functionality or role. For example, FIG. 1A illustrates a diversity tool (DT) VM 104a that may support diversity system 200 virtual network function, as described more completely below. This figure also shows a broadband network gateway (BNG) VM 104b connected to VNF 102. Additionally or alternatively, VM 104 may include other types of VMs. Each VM 104 may consume various network resources from a hardware platform 106, such as a resource 108, a virtual central processing unit (vCPU) 108a, memory 108b, or a network interface card (NIC) 108c. Additionally or alternatively, hardware platform 106 may include other types of resources 108.

Figure 1B:
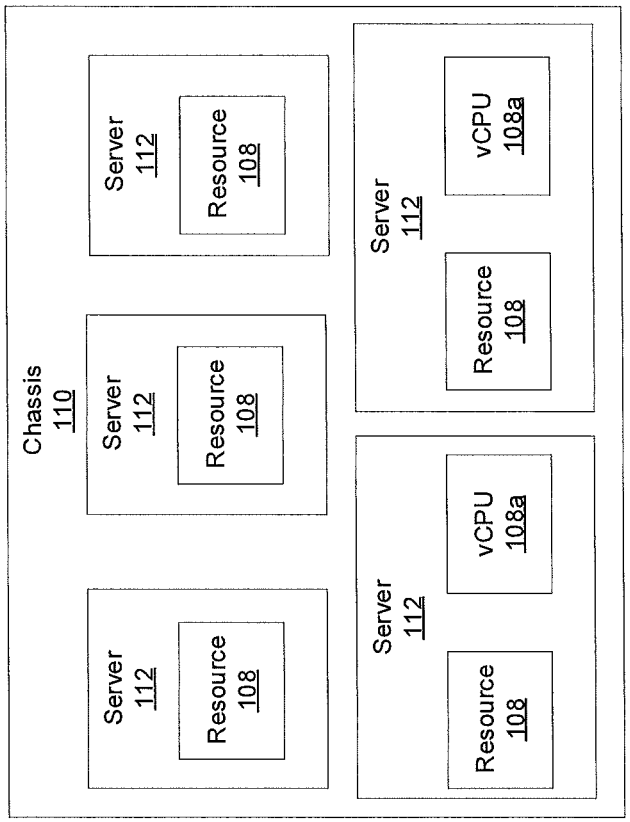
FIG. 1B is a representation of an exemplary hardware platform.

While FIG. 1A illustrates resources 108 as collectively contained in hardware platform 106, the configuration of hardware platform 106 may isolate, for example, certain memory 108c from other memory 108a. FIG. 1B provides an exemplary implementation of hardware platform 106.

Hardware platform 106 may comprise one or more chasses 110. Chassis 110 may refer to the physical housing or platform for multiple servers or other network equipment. In an aspect, chassis 110 may also refer to the underlying network equipment. Chassis 110 may include one or more servers 112. Server 112 may comprise general purpose computer hardware or a computer. In an aspect, chassis 110 may comprise a metal rack, and servers 112 of chassis 110 may comprise blade servers that are physically mounted in or on chassis 110.

Each server 112 may include one or more network resources 108, as illustrated. Servers 112 may be communicatively coupled together in any combination or arrangement. For example, all servers 112 within a given chassis 110 may be communicatively coupled. As another example, servers 112 in different chasses 110 may be communicatively coupled. Additionally or alternatively, chasses 110 may be communicatively coupled together in any combination or arrangement.

The characteristics of each chassis 110 and each server 112 may differ. For example, FIG. 1B illustrates that the number of servers 112 within two chasses 110 may vary. Additionally or alternatively, the type or number of resources 110 within each server 112 may vary. In an aspect, chassis 110 may be used to group servers 112 with the same resource characteristics. In another aspect, servers 112 within the same chassis 110 may have different resource characteristics.

Figure 2:
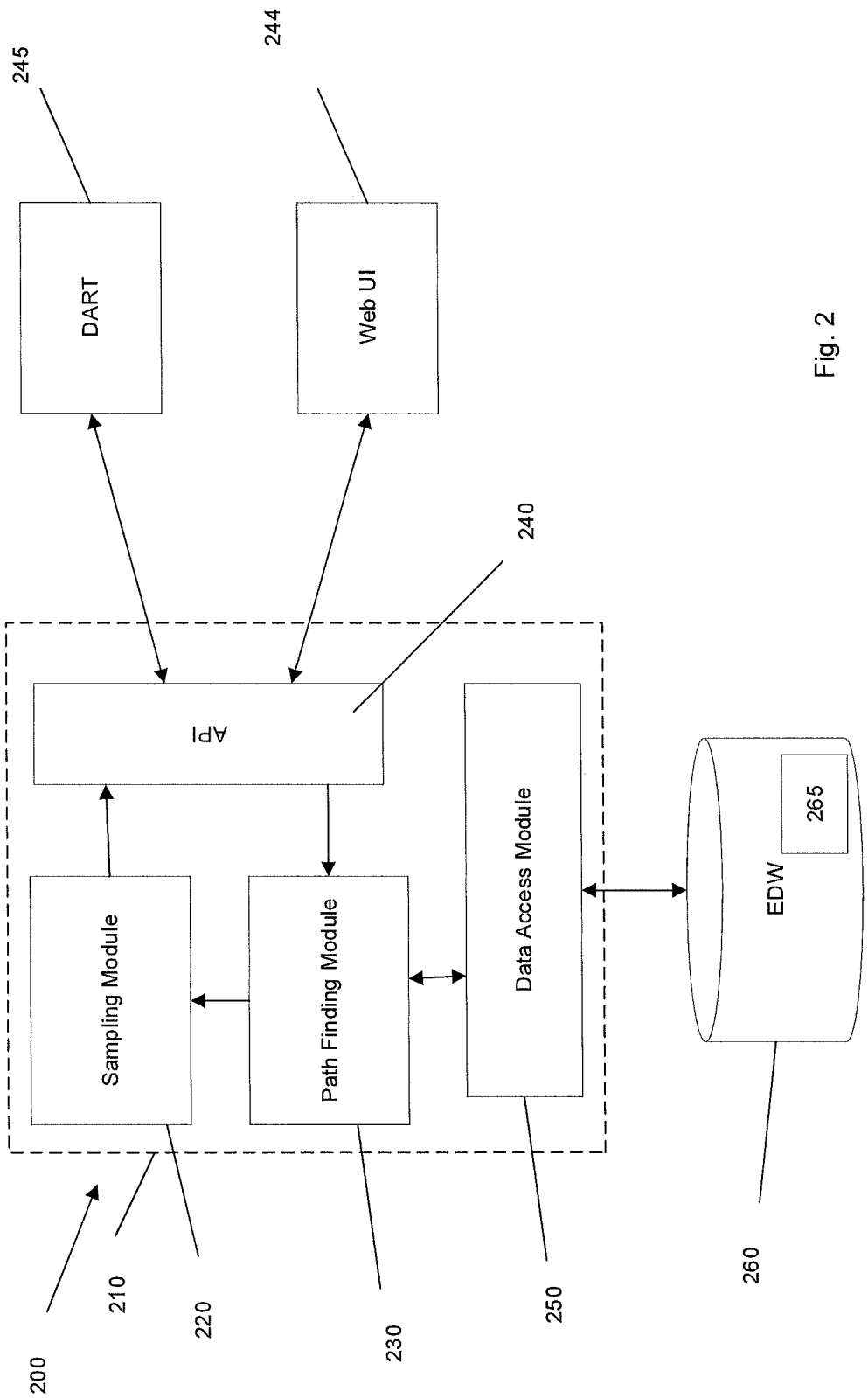
FIG. 2 is a representation of a network diversity system according to an example.

With reference to FIG. 2, a network diversity system 200 generally includes a diversity tool 210. As previously described diversity tool 210 may be implemented as a VM or as a VNF on a SDN 100. Alternatively, diversity tool may be implemented as a component and installed as needed. Diversity tool 210 may generally include a path finding module 220 and a sampling module 230. As shown, path finding module 220 and a sampling module 230 may communicate with an input/output device, which may be implemented via an application programming interface API 240. API 240 may be connected to a user interface 244, such as an internet based user interface, mobile application or the like that is configured to receive a user input described more completely below. API 240 may also be connected to a diversity analysis reporting tool (DART) 245. The API 240 provides an interface through which users or applications, like DART, can interact with the diversity tool 210. In general, DART identifies a diversity issue that needs resolution. The user interface 244 may also be used to identify a diversity issue. To that end, at least one of the user interface 244 or DART 245 may generate a request signal identifying the diversity issue. This request signal may include information identifying the end points involved and/or at least one digital signal (DS0) that is creating the diversity issue. The DS0 is a route element in a network and may viewed as a base element in a network and include, for example, a bandwidth for a single call. It will be understood that the DS0 can be multiplexed into other elements.

When diversity tool 210 receives a request, it gathers network data to build at least one representative path as discussed below. To obtain data, diversity tool 210 may include a data access module 250 to coordinate communication with data sources including, for example, an enterprise data warehouse (EDW) 260. It will be understood that direct communication with EDW 260 may used as an alternative to employing a data access module 250. In one example, the path finding module communicates with EDW 260.

The path finding module 220 is configured to search through a network inventory 265 stored in an EDW 260. Path finding module 220 obtains path information from EDW including all available information for the paths including but not limited to the DS0s riding the path, machine preferences, activity levels and any other information available in the EDW. It will be understood that EDW may have more or less information than the examples provided above. The path finding module 220 takes the information available at the EDW 260.

The path finding module 220 may explore a neighborhood of paths surrounding the end points 201,202 identified in the diversity request signal. For example, path finding module 220 looks to a local neighborhood graph to identify possible paths. As described more completely below, to provide a reasonable amount of path data for evaluation, path finding module 220 may apply heuristics to limit the number of paths considered. For example, paths that appear to be inactive may be withdrawn from consideration. Path finding module 220 may apply other criteria including but not limited to selecting paths based on at least one of a hop number, an active path status, and a path utilization value. In this way, path finding module 220 culls the number of paths for consideration before identifying one or more representative paths 225.

The path finding module 220 constructs a representation 216 to identify at least one representative path 225 between a selected first end point 201 and a second end point 202 as described more completely below. The at least one representative path 225 meets at least a capacity requirement between the first end point 201 and the second end point 202. In one example, the capacity requirement requires that each DS0 in the circuit is diverse relative to another DS0 in the circuit by at least 50 percent. It will be understood that other capacity requirements, i.e. greater or less than 50 percent diversity, may be used as well.

The sampling module 230 generates at least one circuit reassignment plan 235 comprising at least two representative paths 225. The sampling module 230 provides scores for each reassignment plan wherein the score comprises the sum of scores for each circuit in the plan. Each score is based on features such as: machine preference, path length, and the number of changes needed to implement. In one example, to determine a score or otherwise evaluate assignment quality, sampling module 230 incorporates a model guided sampling procedure to identify potential diversity solutions. In this example, the sampling module is configured to generate a general solution one DS0 at a time as follows. First DS0s are randomly added to the set of paths already included in the general solution until doing so would result in a diversity violation. At this point, a new path is added to the set of included paths from the set of representative paths for which a DS0 could be added to achieve a diverse sub-solution. The selection criteria could be probabilistic such that higher scoring paths are more likely to be selected. Sampling module 230 can repeat this process to generate one or more general solutions.

The sampling module 230 produces at least one circuit reassignment plan that satisfies the diversity constraints using at least the one general solution by assigning DS0s to specific paths that comprise the general solution. It will be understood that multiple DS0s can ride a single path and still meet diversity constraint requirements. As indicated previously, according to example described in FIG. 2A, the diversity constraint may require each DS0 to be diverse from at least 50% of other DS0s in the plan. The sampling module 230 ranks and scores the circuit reassignment plans. This score includes those arrived at while building the general solution and may be further weighted by applying additional considerations such as the number of changes needed, the location of the path, paths that avoid the use of legacy equipment, the activity/utilization level of the paths or DS0s included in the path, the preferences of machines in the path, the hop number and the like. This additional information may also be used to weight the score for the representative paths 225. Circuit reassignment plans requiring fewer changes may be scored higher than plans that require a larger number of changes. It will be understood that the score may be arrived at iteratively. For example, in a first operation, each representative path in the plan gets a score based on activity/utilization level of the respective path. The score for the plan may simply be a sum of the scores of the representative paths that comprise the solution. In a second operation, the sampling module considers the number of changes to implement the plan and this is used to modify the score that is arrived at at the end of the first operation.

Figure 2A:
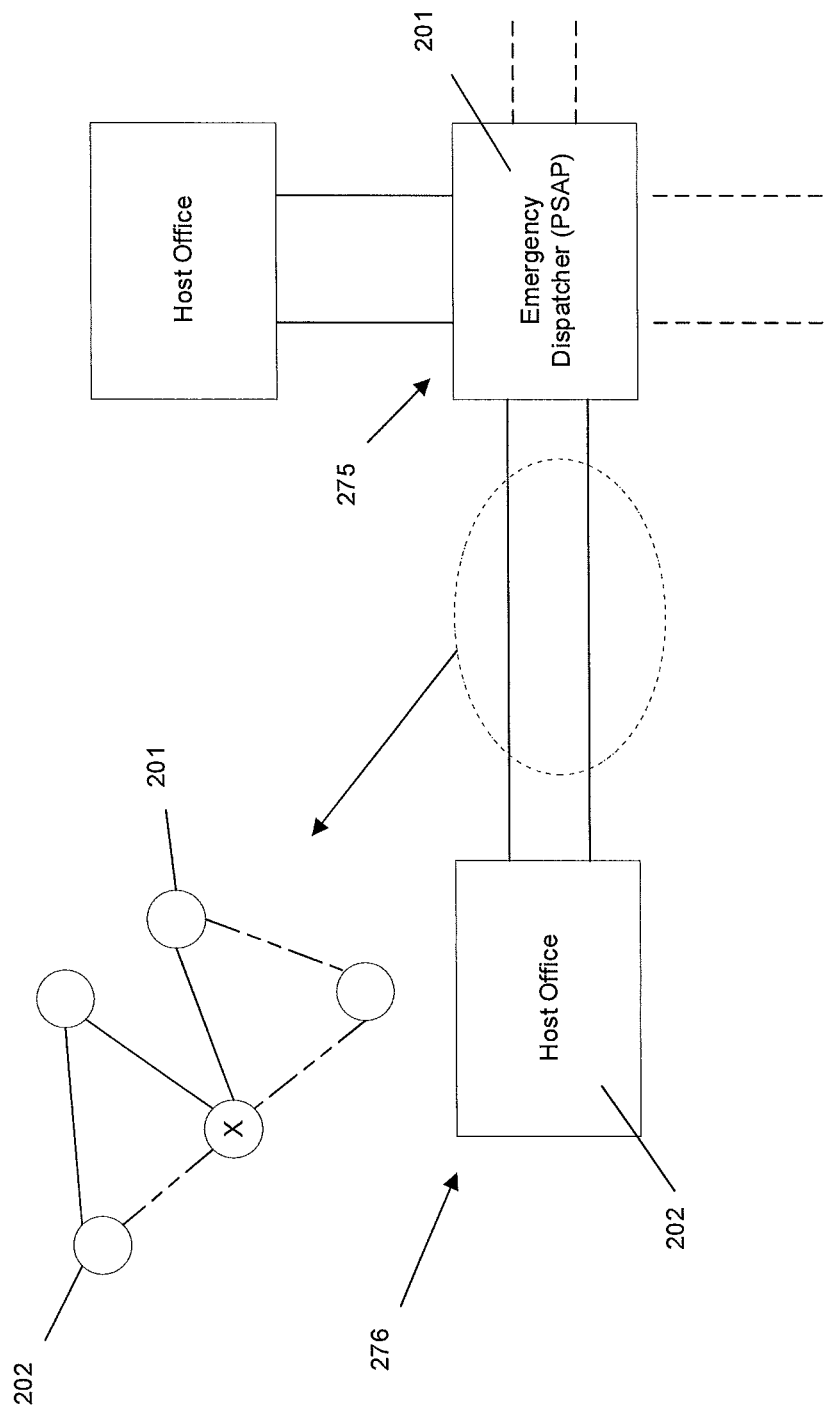
FIG. 2A is a representation similar to FIG. 2 depicting an example where a priority request is denied.

With reference to FIG. 2A, an emergency call example is shown. In the example, an emergency call center or dispatcher PSAP is indicated by the number 275. In this example, emergency dispatcher 275 forms a first end point 201, and a host office 276 may form a second end point 202. A diversity issue is identified in the path 277 between these two endpoints 201, 202. The diversity issue is graphically depicted in the enlarged portion at 278. Node X is identified as having a diversity issue. In the emergency call example, a diversity constraint may require a minimum diversity of two lines through the network, no shared equipment, no shared fiber, or a floor of 50% DS0s. In this case, the two routes (solid and dashed lines) share node X. While an emergency call center is one possible application of the diversity system 200, it will be understood that this system 200 may be applied to other applications that include diversity criteria including but not limited to other critical communication operations, such as, first responder networks; or non-critical communications where diversity is desired from a performance or quality of service/experience standpoint, such as, AT&T U-verse.

In the depicted example, sample module 230 may create a general solution identifying the paths and how many emergency lines are assigned to each path. It remains to assign circuits (DS0s) to the paths. Sampling module 230 shuffles the circuits and assigns them to a path with which they score most favorably. In this way, the sampling module 230 reduces the number of possible solutions to a manageable number. The specific solution embodied in plan 235 includes the best score generated from the representative paths.

According to an example, sampling module 230 communicates with user interface 244 via the input/output device 240 sending the representative path and score to the user interface 244. In an example, diversity tool 210 may await an input from the user interface 244 approving the representative path before implementing the representative path in the network 100.

In another example, the sampling module 230 may implement a representative path 225 automatically. For example, the sampling module 230 may implement the representative path having the best score. In this example, sampling module may communicate with a memory and store a report identifying the representative path implemented by the sampling module in the memory. Sampling module 230 may also send the report to a network manager or other user via input/output device.

In another example, the user interface 244 may be used to preselect an acceptable score range to permit automatic approval of any representative path meeting the acceptable score range limitations. A variation on this example, may include presetting such a range upon instantiation of the diversity tool 210 as a parameter of the tool 210.

Figure 2B:
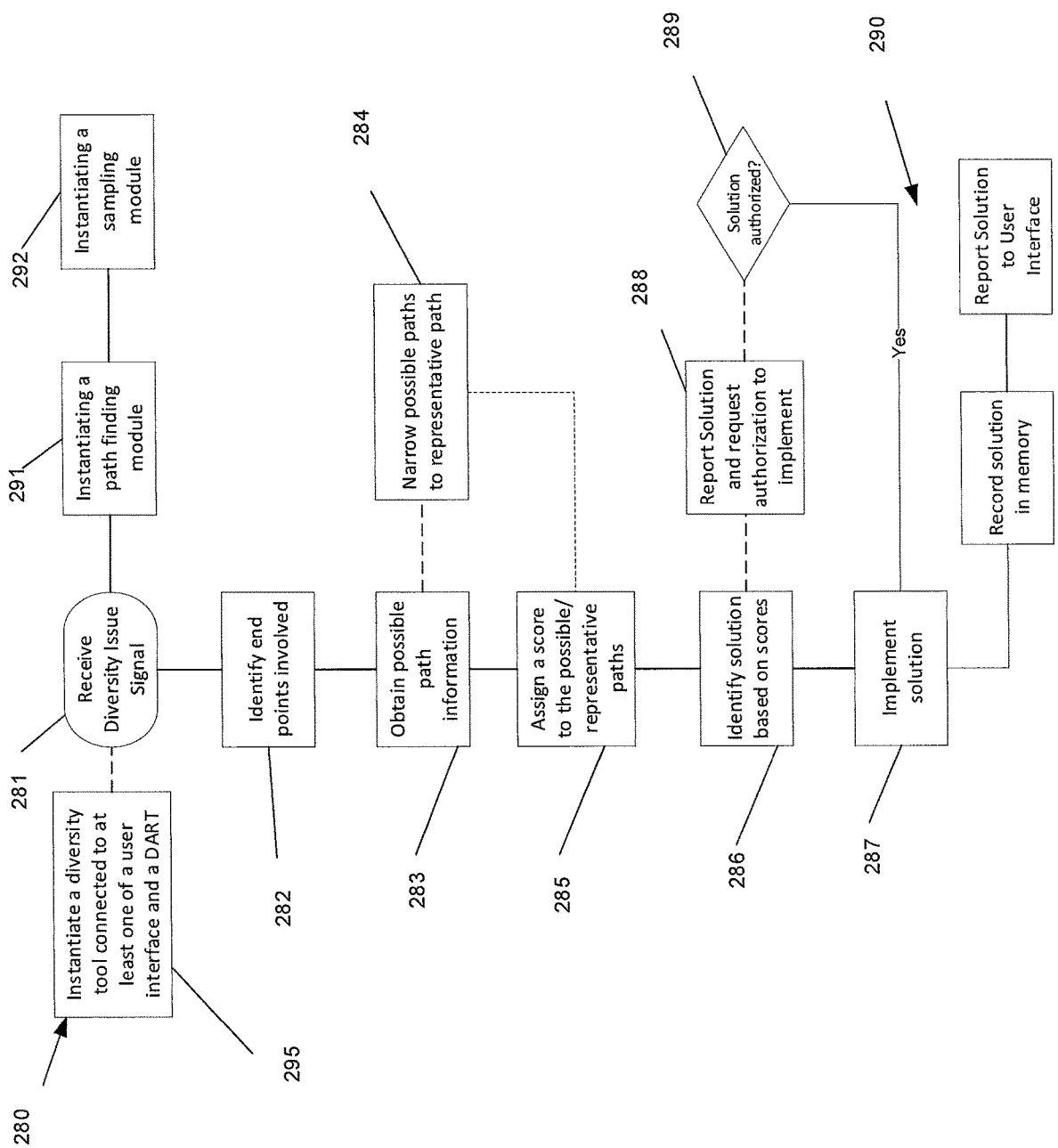
FIG. 2B is a flow chart depicting operation of the network diversity system according to an example.

With reference to FIG. 2B, network diversity system 200 may perform operations, generally indicated at 280, to identify a solution for a diversity issue. Upon receiving a diversity issue notice at 281, the system 200 identifies the end points involved in the violation at 282. Based on the end points, system 200 obtains possible paths to a solution at 283. As indicated above, the possible paths may be obtained by a path finding module 220 from an EDW 260 via data access module 250. The step of obtaining possible paths 283 may include narrowing, at 284, the number of possible solutions to a representative path 225 as discussed above. The path finding module 220 passes the possible paths or representative path(s) 225 to sampling module 230. At step 285, system ranks the possible paths or representative paths by assigning a score to each path. The step of assigning a score 285 may include applying a general score based on the diversity criteria and weighting the general score based on additional criteria discussed above to arrive at a final score. After the paths are scored, the system identifies a solution at 286. The solution may include the highest scoring path or a set of paths with higher scores. According to one example, after identifying the solution, the system may implement the solution at 287 without further input. Alternatively, system 200 may report the solution at 288 and await an authorization signal from a user interface to implement the solution at 289. When implementing a solution, system 200 may store the implemented solution in memory and/or provide a report to a user interface as indicated generally at 290. As further depicted in FIG. 2B, when implementing network diversity system 200 in an SDN, the operations 280 may further include the steps of instantiating a path finding module 220 at 291, instantiating a sampling module at 292. As indicated at 295, operations 280 may optionally include the steps of instantiating a diversity tool and connecting it to at least one of a DART or a user interface to receive a diversity issue signal at 281, as described above.

Figure 3:
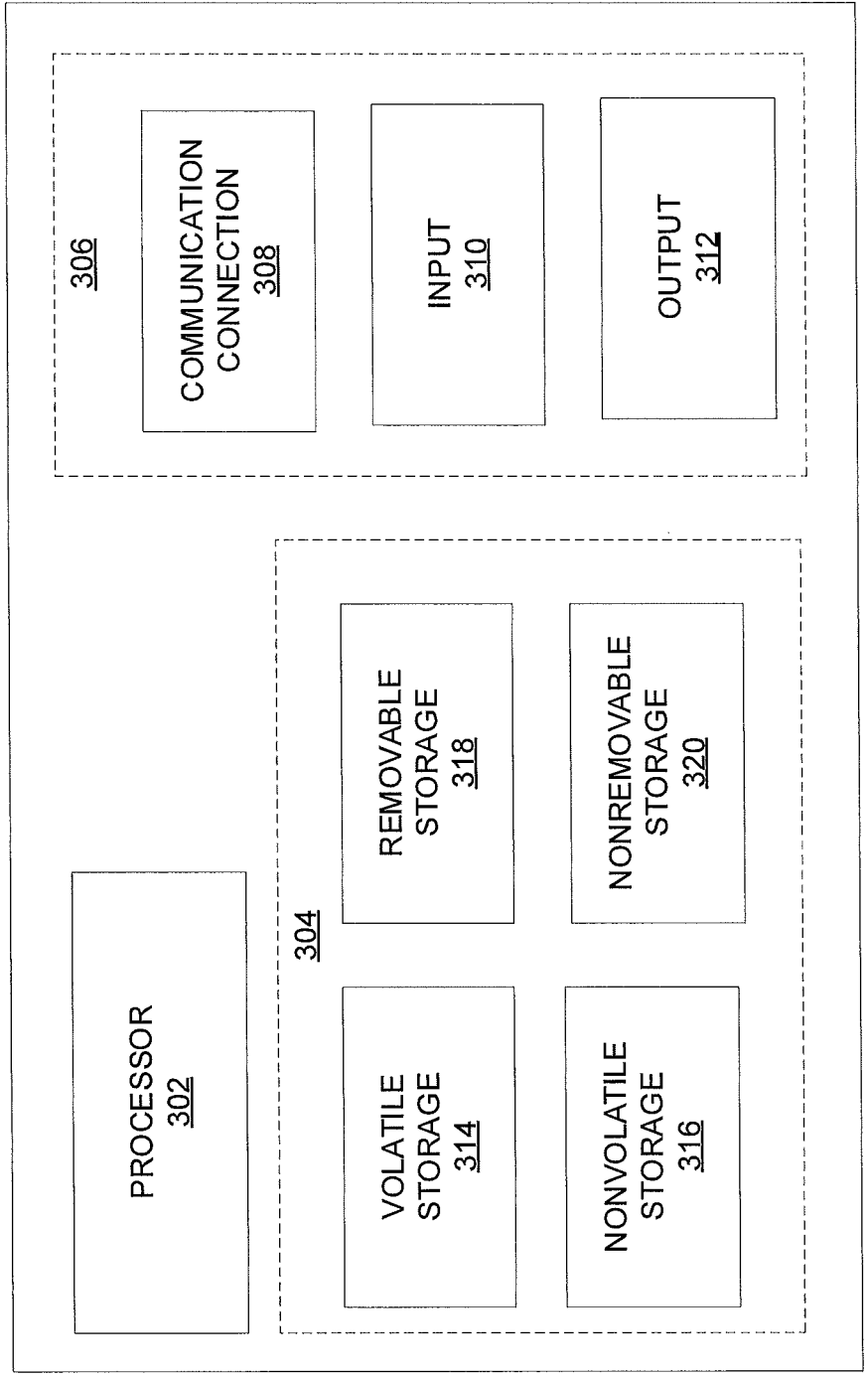
FIG. 3 is a representation of a network device according to an example.

As referenced above, network diversity system 200 may be implemented in a network device. FIG. 3 illustrates a functional block diagram depicting one example of a network device, generally indicated at 300. Network device 300 may comprise a processor 302 and a memory 304 coupled to processor 302. Memory 304 may contain executable instructions that, when executed by processor 302, cause processor 302 to effectuate operations associated with building and onboarding at least one VNF as described above. As evident from the description herein, network device 300 is not to be construed as software per se.

In addition to processor 302 and memory 304, network device 300 may include an input/output system 306. Processor 302, memory 304, and input/output system 306 may be coupled together to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), electrical means, or a combination thereof. In an example configuration, input/output system 306 may comprise a Wi-Fi finder, a two-way GPS chipset or equivalent, or the like, or a combination thereof. Bluetooth, infrared, NFC, and Zigbee are generally considered short range (e.g., few centimeters to 20 meters). WiFi is considered medium range (e.g., approximately 100 meters).

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to change QOS on demand as described above.

Figure 4:
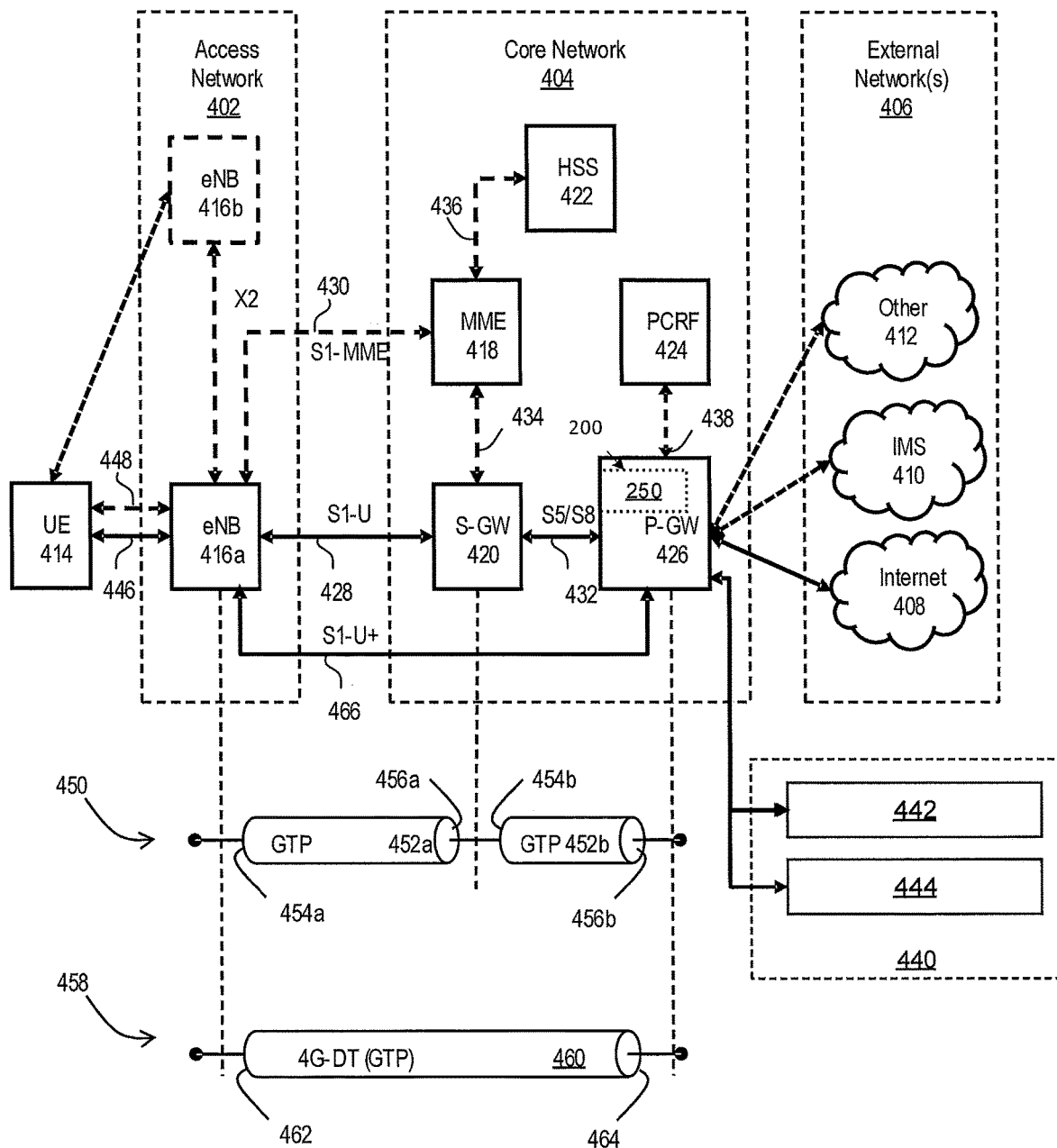
FIG. 4 depicts an exemplary communication system that provides wireless telecommunication services over wireless communication networks that may be at least partially implemented as an SDN.

As discussed previously, a quality of service system 200 diversity tool 210 may be incorporated in an SDN 100. SDN 100 may be implemented in or communicate with a variety of network architectures. Example architectures will now be described with reference to FIGS. 4-10. These examples should not be considered limiting. FIG. 4 illustrates a functional block diagram depicting one example of an LTE-EPS network architecture 400 that may be at least partially implemented as an SDN 100. Network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. LTE-EPS network architecture 400 may include an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like. In an aspect, access network 402, core network 404, or external network 405 may include or communicate with network 100.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416a.

HSS 422 can manage subscription-related information for a user of UE 414. For example, tHSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416*a* and PGW 426. Notably, S1-U+ path/interface does not include SGW 420, a node that is otherwise instrumental in configuring and/or managing packet forwarding between eNB 416*a* and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches and controllers. In addition, although FIG. 4 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416*a*, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 4. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 100, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. That is, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 1B:
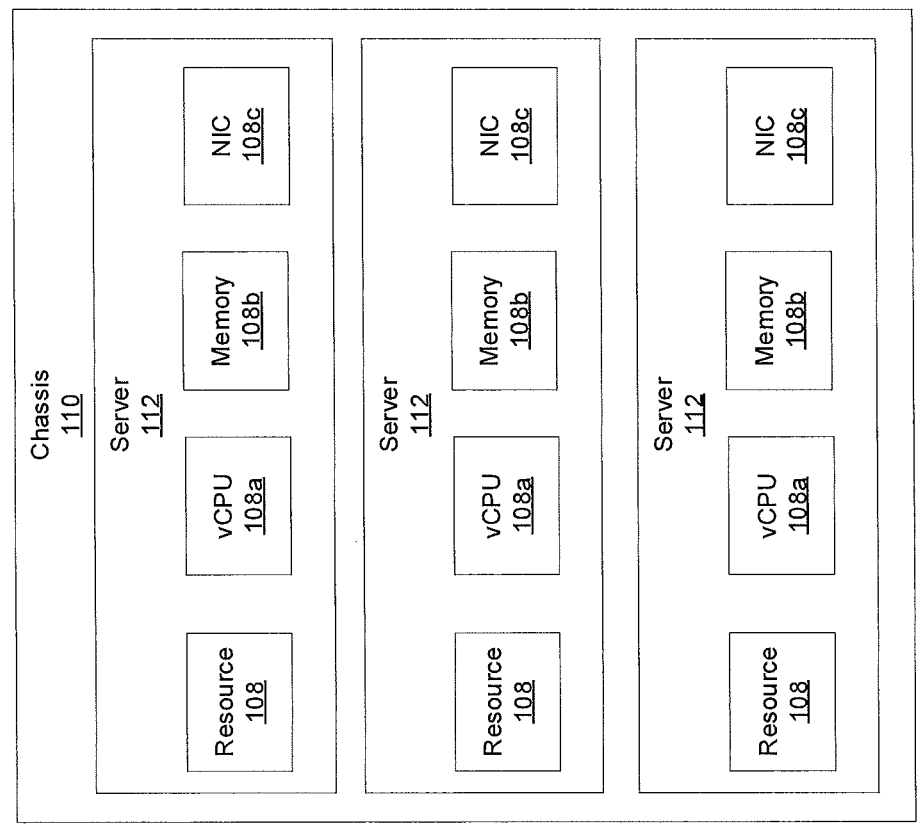
Figure 5:
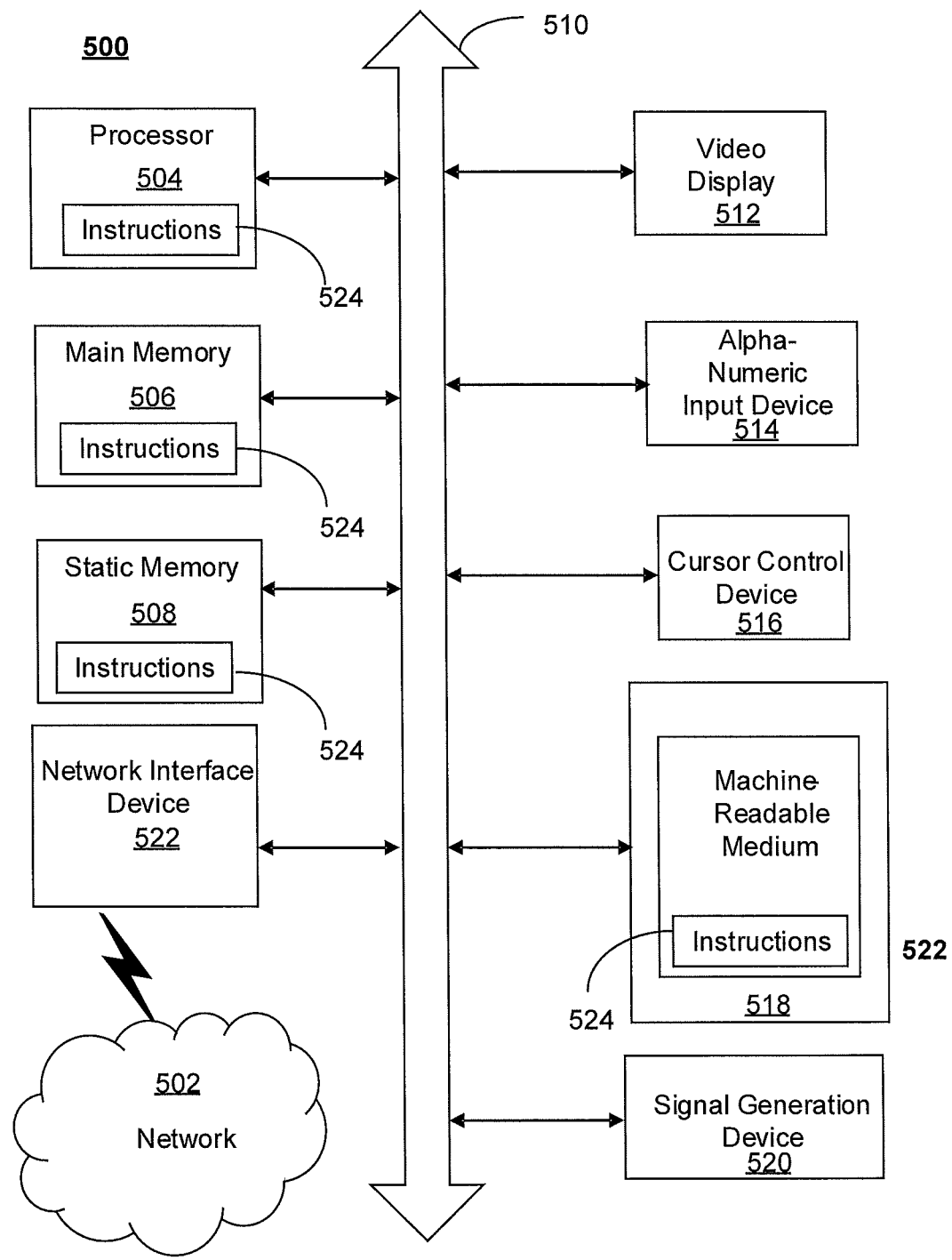
FIG. 5 depicts an exemplary diagrammatic representation of a machine in the form of a computer system.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 414, eNB 416, MME 418, SGW 420, HSS 422, PCRF 424, PGW 426 and other devices of FIGS. 1, 2, and 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6:
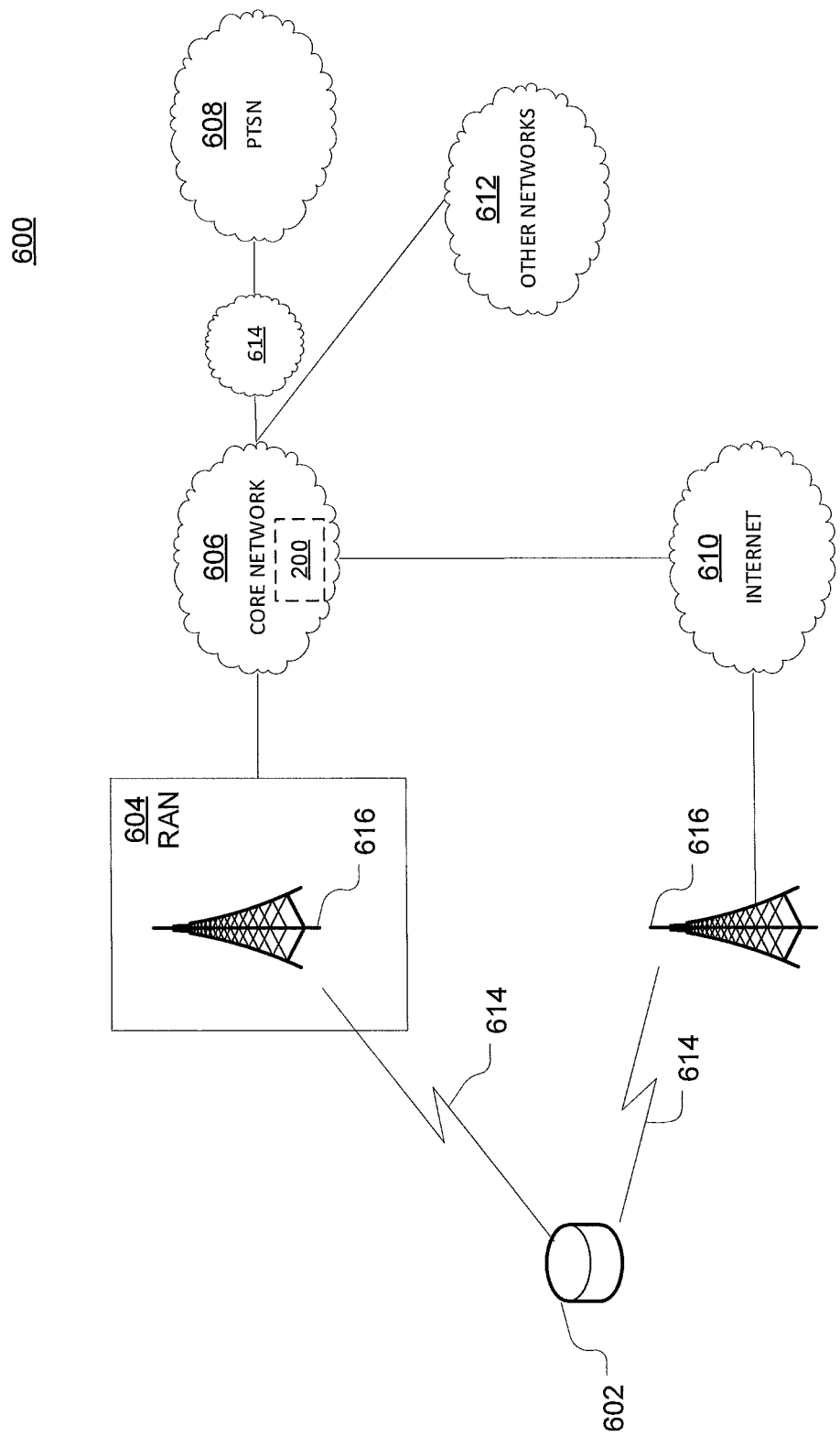
FIG. 6 is a representation of a telecommunications network.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise drone 102, a mobile device, network device 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements, such as a base station controller (BSC), a radio network controller (RNC), or relay nodes. One or more base stations 616 may be configured to transmit or receive wireless signals within a particular geographic region, which may be referred to as a cell. The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over Internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 7:
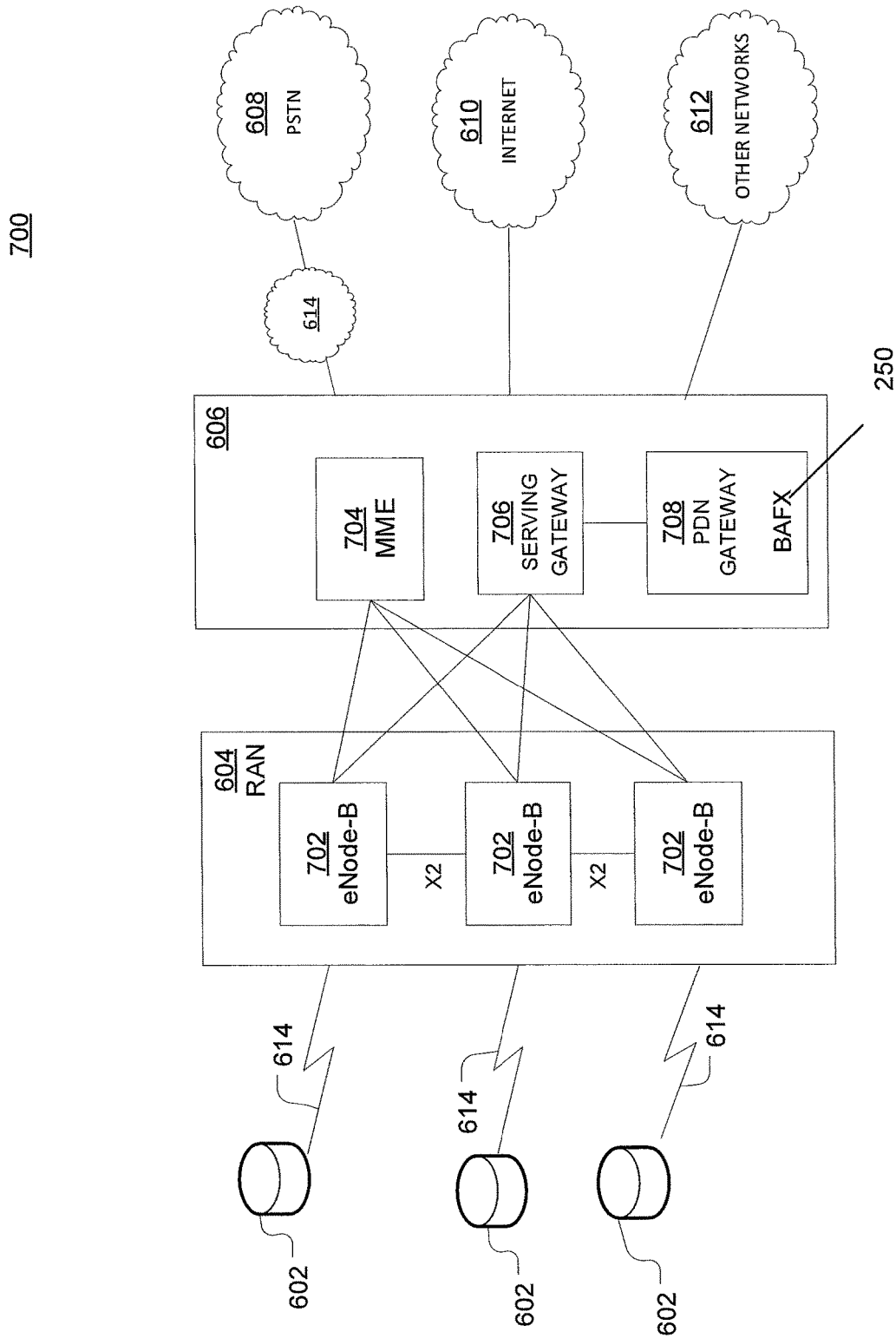
FIG. 7 is a representation of a core network.

FIG. 7 is an example system 700 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell and may be configured to handle radio resource management decisions, handover decisions, scheduling of users in the uplink or downlink, or the like. As shown in FIG. 7 eNode-Bs 702 may communicate with one another over an X2 interface.

Core network 606 shown in FIG. 7 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs that employ other radio technologies, such as GSM or WCDMA.

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

Figure 8:
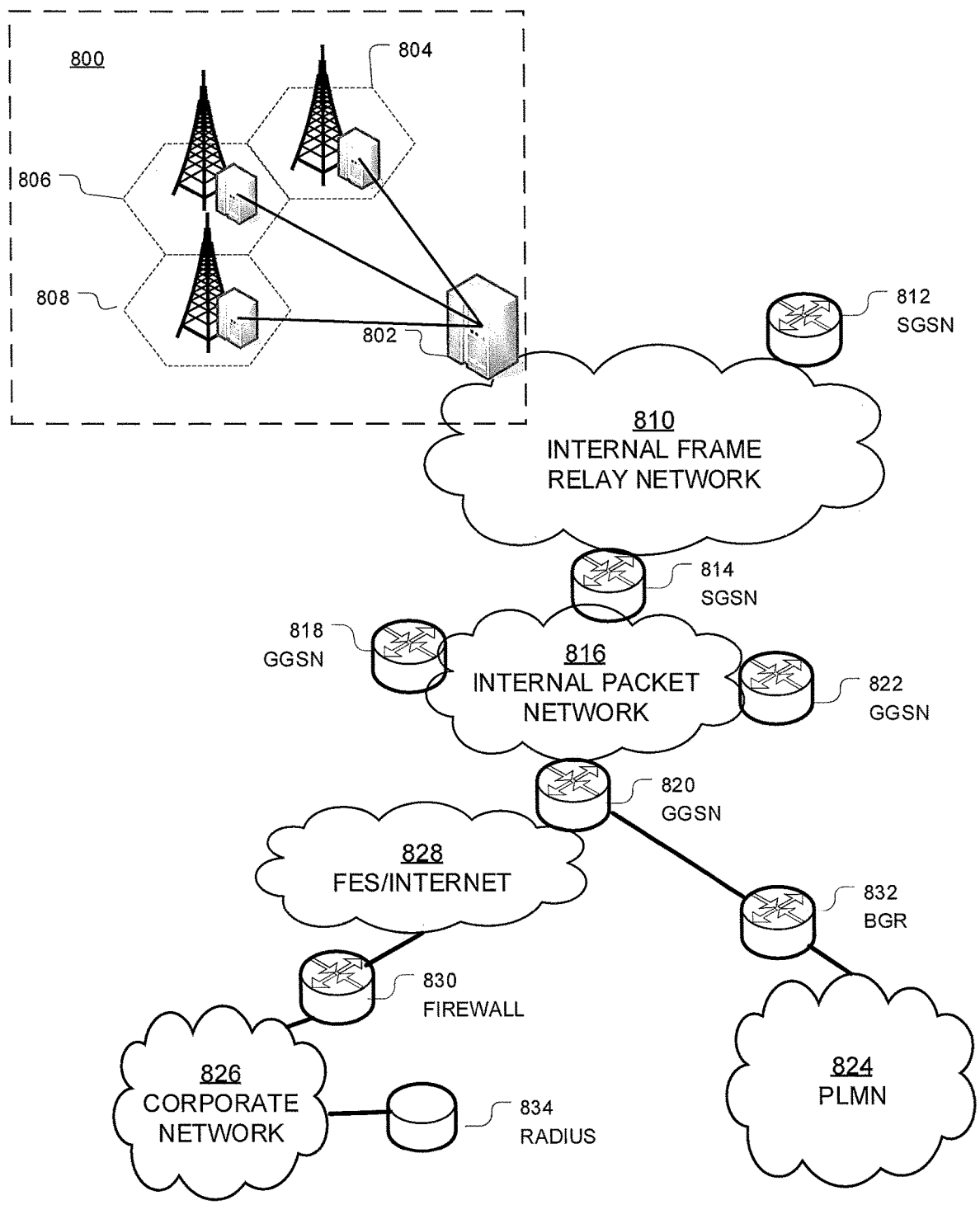
FIG. 8 is a representation packet-based mobile cellular network environment.

FIG. 8 depicts an overall block diagram of an example packet-based mobile cellular network environment, such as a GPRS network as described herein. In the example packet-based mobile cellular network environment shown in FIG. 8, there are a plurality of base station subsystems (BSS) 800 (only one is shown), each of which comprises a base station controller (BSC) 802 serving a plurality of BTSs, such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a service GPRS support nodes (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as PLMN 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a border gateway router (BGR) 832. A Remote Authentication Dial-In User Service (RADIUS) server 834 may be used for caller authentication when a user calls corporate network 826.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 9:
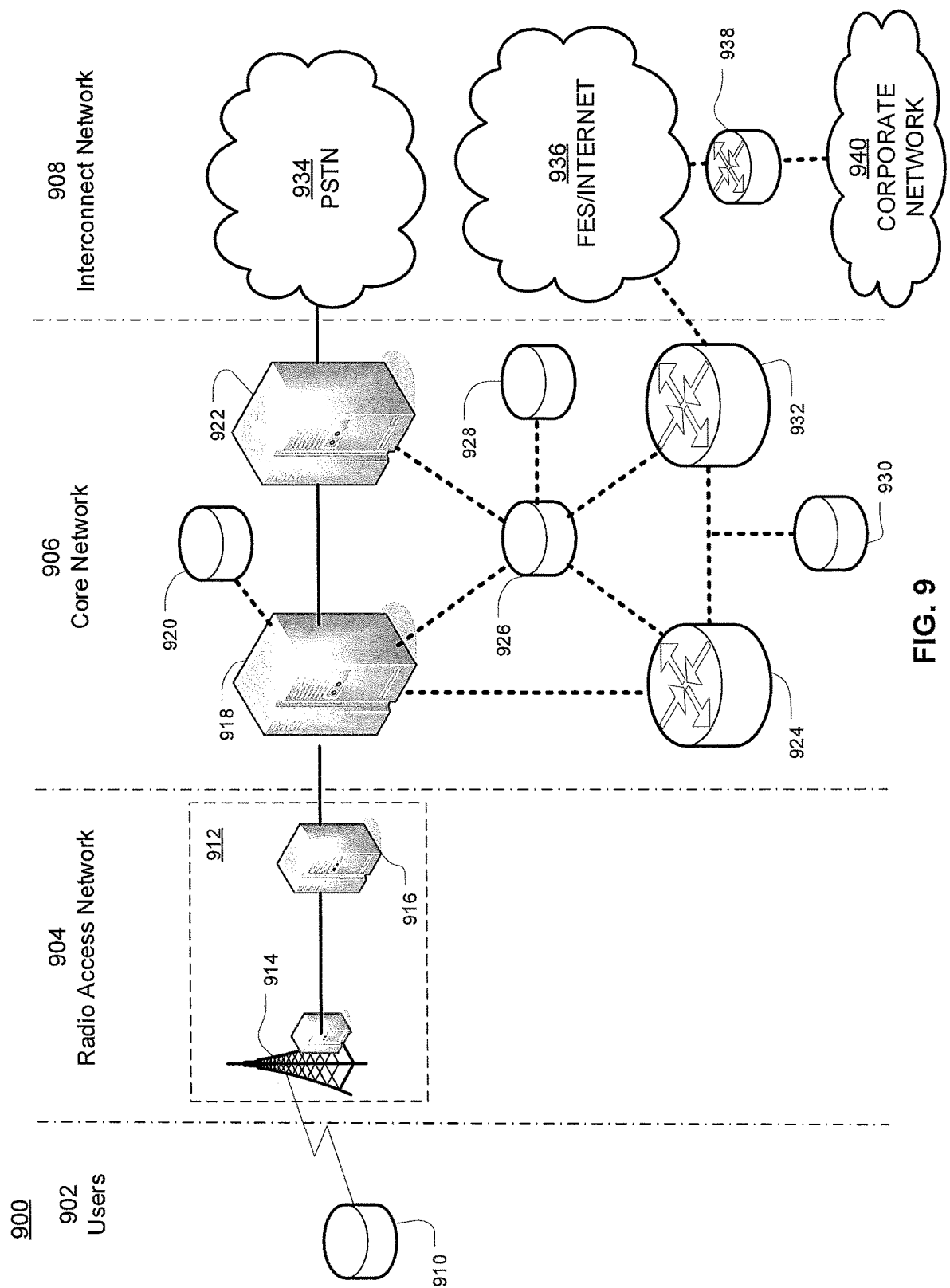
FIG. 9 is a representation of a GPRS network.

FIG. 9 illustrates an architecture of a typical GPRS network 900 as described herein. The architecture depicted in FIG. 9 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 9. In an example, device 910 comprises a communications device (e.g., mobile device 102, mobile positioning center 116, network device 300, any of detected devices 500, second device 508, access device 604, access device 606, access device 608, access device 610 or the like, or any combination thereof). Radio access network 904 comprises a plurality of BSSs such as BSS 912, which includes a BTS 914 and a BSC 916. Core network 906 may include a host of various network elements. As illustrated in FIG. 9, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 9, interconnect network 908 comprises a PSTN 934, an FES/Internet 936, a firewall 1038 (FIG. 10), or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate. HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 9, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1038, to reach corporate network 940.

Figure 10:
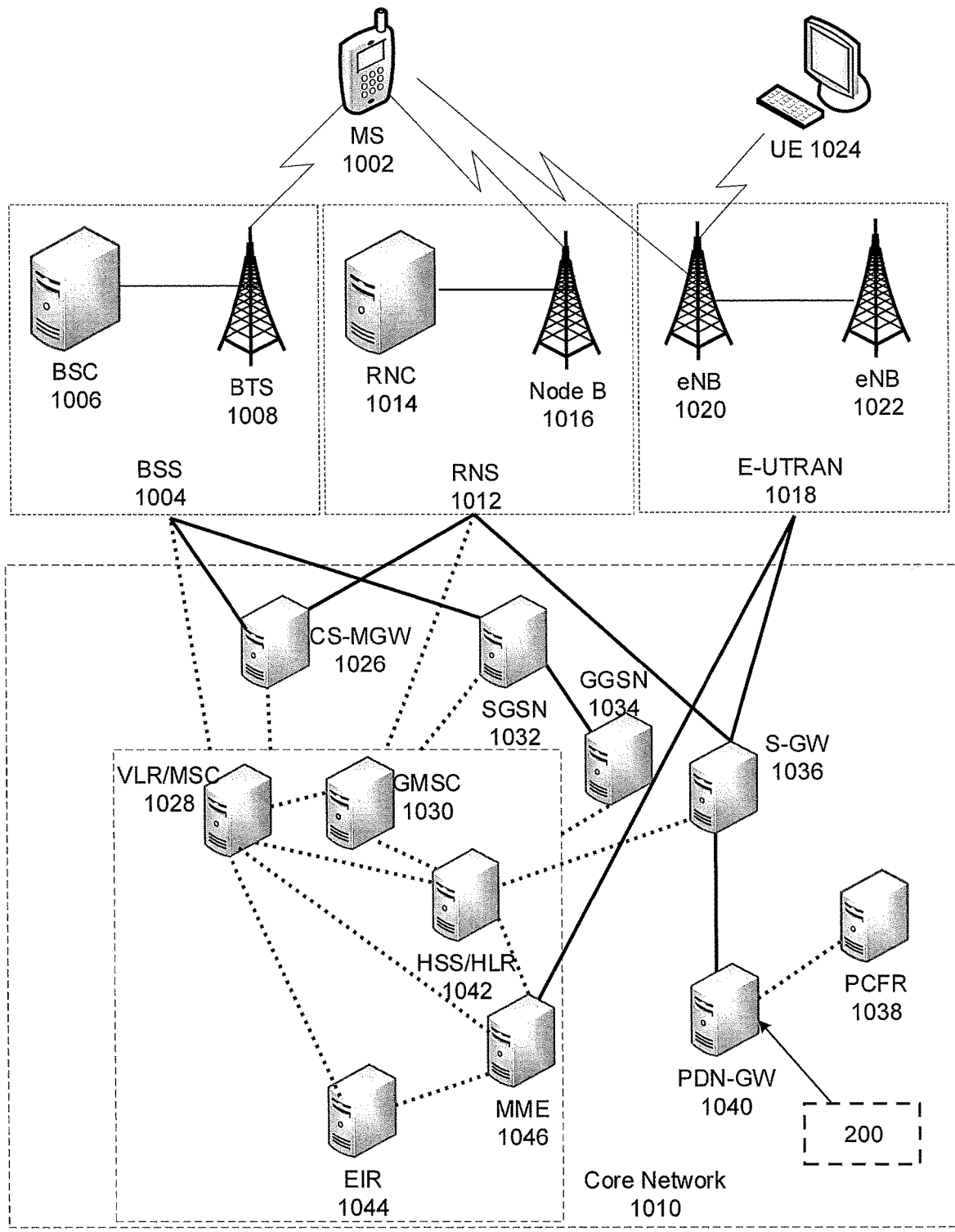
FIG. 10 is a representation a PLMN architecture.

FIG. 10 illustrates a block diagram of an example PLMN architecture that may be replaced by a telecommunications system. In FIG. 10, solid lines may represent user traffic signals, and dashed lines may represent support signaling. MS 1002 is the physical equipment used by the PLMN subscriber. For example, drone 102, network device 300, the like, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains. BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically MS 1002 may communicate with any or all of BSS 1004, RNS 1012, or E-UTRAN 1018. In a illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1026 is part of core network 1010, and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location information such as, but not limited to, GGSN address for each GGSN 1034 where an active PDP exists. GGSN 1034 may implement a location register function to store subscriber data it receives from SGSN 1032 such as subscription or location information.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location information. HSS 1042 may also provide call or session establishment procedures in both the PS and CS domains.

VLR/MSC Server 1028 provides user location functionality. When MS 1002 enters a new network location, it begins a registration procedure. A MSC server for that location transfers the location information to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. A MME 1046 is a control node which may track MS 1002 or UE 1024 if the devices are idle. Additional functionality may include the ability of MME 1046 to contact idle MS 1002 or UE 1024 if retransmission of a previous session is required.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which emergency alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

EXAMPLES

Example 1

A network diversity resolution system comprising a diversity assessment tool, the diversity assessment tool including a path finding module and a sampling module that communicate with an input/output device; the path finding module communicates with an enterprise data warehouse; the path finding module configured to search through a network inventory stored in the enterprise data warehouse, the path finding module constructing a representation to identify at least two representative paths between a selected first end point and a second end point; wherein the at least two representative paths meets at least a capacity requirement between the first end point and the second end point; and wherein the sampling module generates at least one circuit reassignment plan based on the at least two representative paths, wherein the sampling module provides a score for each of the at least one circuit reassignment plan, wherein the score is based on at least one of a machine preference, path length, and number of changes to implement the at least one circuit reassignment plan, wherein the at least one circuit reassignment plan incorporates at least one representative path having a highest score.

Example 2

The system of example 1 further comprising a data access module in communication with the path finding module and the enterprise data warehouse, wherein the data access module is configured to query the enterprise data warehouse for the network inventory.

Example 3

The system of example 1, wherein the sampling module is configured to incorporate one path at a time when preparing the at least one circuit reassignment plan to evaluate diversity as each path is added.

Example 4

The system of example 1, wherein at least one of the first end point and second end point is an emergency call center.

Example 5

The system of example 1, wherein the capacity requirement requires that each DS0 in the circuit is diverse relative to an other DS0 in the circuit by at least 50 percent.

Example 6

The system of example 1, wherein the path finding module provides a selected set of paths, where the selected set of paths is chosen based on at least one of a hop number, an active path status, and a path utilization value.

Example 7

The system of example 1, wherein the sampling module is configured to generate a general solution by randomly adding a DS0 to a first path until a diversity violation occurs and repeating this process for at least one alternate path, wherein the representative path is a general path without the DS0 that caused the diversity violation.

Example 8

The system of example 7, wherein the score is based on the representative path and weighted based on the probability of adding a DS0 that will cause the diversity violation in the general solution.

Example 9

The system of example 8, wherein the score further is weighted based on a number of changes required to the representative path.

Example 10

The system of example 1, wherein the sampling module communicates with a user interface via the input/output device, and where the sampling module sends the representative path and score to the user interface, and awaits an input from the user interface before implementing the representative path.

Example 11

The system of example 1, wherein the sampling module implements the representative path having the best score automatically.

Example 12

The system of example 11, wherein the sampling module communicates with a memory, wherein the sampling module stores a report identifying the representative path implemented by the sampling module in the memory.

Example 13

A network device comprising: a processor, an input/output device coupled to the processor, and a memory coupled with the processor, the memory comprising executable instructions that when executed by the processor cause the processor to effectuate operations comprising: upon receiving a diversity issue for a path between at least two end points, via the input/output device, obtaining possible path information including at least two representative paths; assigning a score to the at least two representative paths; identifying a solution based on the score.

Example 14

The network device of example 13, wherein the step of identifying the solution includes identifying the at least one representative step with the highest score.

Example 15

The network device of example 13, wherein the operations further include reporting the solution via the input/output device.

Example 16

The network device of example 15, wherein the operations further include upon receiving an authorization signal, implementing the solution.

Example 17

The network device of example 13, wherein the operations further include automatically implementing the solution.

Example 18

The network device of example 17, wherein the operations further include recording the solution in the memory.

Example 19

The network device of example 13, wherein the step of assigning a score includes assigning a general score based on diversity criteria and weighting the general score based on at least one of a number of changes, a path location, avoiding legacy equipment, an activity/utilization level, a preference of a machine or DS0 in the representative path, a hop number, and the number of DS0s in the representative path.

Example 20

A method comprising instantiating a diversity assessment tool, the diversity assessment tool including a path finding module virtual network function and a sampling module virtual network function that communicate with an input/output device and a memory; obtaining path information from an electronic data warehouse; the path finding module identifying at least two representative paths between a selected first end point and a second end point, wherein the at least two representative paths meets at least a capacity requirement between the first end point and the second end point; and the sampling module generating at least one circuit reassignment plan based on the at least two representative paths, wherein the generating step includes assigning a score for each of the at least one circuit reassignment plan, wherein the score is based on at least one of a machine preference, path length, and number of changes to implement the at least one circuit reassignment plan, wherein the at least one circuit reassignment plan incorporates at least one representative path having a highest score.

The invention claimed is:

1. A network diversity resolution system comprising:
a diversity assessment tool in communication with an input/output device, wherein the diversity assessment tool has a processor and memory, the memory storing executable instructions that when executed by the processor, cause the processor to effect operations comprising:
receiving an indication that at least one digital signal (DS0) is violating a diversity requirement;
determining that a diversity requirement between a first end point and a second end point for the at least one DS0 has been violated;
communicating with an enterprise data warehouse searching through a network inventory stored in the enterprise data warehouse,
constructing a representation to identify at least two representative paths between the selected first end point and the second end point to carry the at least one DS0,
wherein the at least two representative paths meet the diversity requirement between the first end point and the second end point; and
wherein the operations further comprise sampling at least one circuit reassignment based on the at least two representative paths; providing a score for each of the at least one circuit reassignment plan, wherein the score is based on at least one of a machine preference, path length, and number of changes to implement the at least one circuit reassignment plan, and wherein the at least one circuit reassignment plan incorporates at least one representative path having a highest score and that satisfies the diversity requirement.

2. The system of claim 1 wherein the operations further comprise querying the enterprise data warehouse for the network inventory.

3. The system of claim 1, wherein the sampling step incorporates one path at a time when preparing the at least one circuit reassignment to evaluate diversity as each path is added.

4. The system of claim 1, wherein at least one of the first end point and the second end point is an emergency call center.

5. The system of claim 1, wherein a capacity requirement requires that each DS0 in the circuit is diverse relative to another DS0 in the circuit by at least 50 percent.

6. The system of claim 1, wherein the operations further comprise selecting a set of paths resulting in a selected set of paths, wherein the selected set of paths is chosen based on at least one of a hop number, an active path status, and a path utilization value.

7. The system of claim 1, wherein the sampling step generates a general solution by randomly adding a DS0 to a first path until a diversity violation occurs and repeating the sampling step for at least one alternate path, wherein the representative path is a general path without the DS0 that caused the diversity violation.

8. The system of claim 7, wherein the score is based on the representative path and weighted based on probability of adding a DS0 that will cause the diversity violation in the general solution.

9. The system of claim 8, wherein the score further is weighted based on a number of changes required to the representative path.

10. The system of claim 1, wherein the sampling step comprises communicating with a user interface via the input/output device, and sending the representative path and the score to the user interface, and receiving an input from the user interface before implementing the representative path.

11. The system of claim 1, wherein the sampling step comprising implementing the representative path having a best score automatically.

12. The system of claim 11, wherein the sampling step comprises communicating with another memory and storing a report identifying the representative path implemented by the sampling step in another memory.

13. A method comprising:
- instantiating a diversity assessment tool in communication with an input/output device and a memory;
- receiving an indication that at least one digital signal (DSO) is violating a diversity requirement;
- determining that a diversity requirement between a first end point and a second end point for the at least one DSO has been violated;
- obtaining path information from an electronic data warehouse;
- identifying at least two representative paths between a selected first end point and a second end point to carry the at least one DSO, wherein the at least two representative paths meets at least the diversity requirement between the first end point and the second end point; and
- generating at least one circuit reassignment plan based on the at least two representative paths, wherein the generating step includes assigning a score for each of the at least one circuit reassignment plan, wherein the score is based on at least one of a machine preference, path length, and number of changes to implement the at least one circuit reassignment plan, wherein the at least one circuit reassignment plan incorporates at least one representative path having a highest score and that satisfies the diversity requirement.

* * * * *